United States Patent
Boock

[19]

[11] Patent Number: 6,065,717
[45] Date of Patent: May 23, 2000

[54] NOISE ATTENUATING WALL ELEMENT

[75] Inventor: Klaus Boock, Timmdorf, Germany

[73] Assignee: DaimlerChrysler Aerospace Airbus GmbH, Hamburg, Germany

[21] Appl. No.: 08/994,726

[22] Filed: Dec. 19, 1997

[30] Foreign Application Priority Data

Dec. 21, 1996 [DE] Germany ............... 196 53 850

[51] Int. Cl.$^7$ ...................................... B32B 3/12
[52] U.S. Cl. .................. 244/1 N; 244/119; 428/118; 181/287
[58] Field of Search .................. 244/1 N, 119, 244/17 R, 118.1; 181/286, 287, 288, 291, 292, 294; 428/118, 116, 131, 134, 137, 138, 284, 285, 703

[56] References Cited

U.S. PATENT DOCUMENTS

| | | |
|---|---|---|
| 2,477,852 | 8/1949 | Bacon . |
| 3,910,374 | 10/1975 | Holehouse . |
| 4,155,211 | 5/1979 | Saylor et al. ............... 181/295 |
| 4,235,303 | 11/1980 | Dhoore et al. . |
| 4,248,647 | 2/1981 | Herron et al. ............... 181/292 |
| 4,265,688 | 5/1981 | Gorski . |
| 4,275,801 | 6/1981 | Bschorr . |
| 4,294,329 | 10/1981 | Rose et al. ............... 181/292 |
| 4,317,503 | 3/1982 | Soderquist et al. ............ 428/118 |
| 4,341,053 | 7/1982 | Dettfurth et al. . |
| 4,353,433 | 10/1982 | Mohrenstein-Ertel et al. . |
| 4,392,027 | 7/1983 | Bock . |
| 4,560,028 | 12/1985 | Perret ............... 181/292 |
| 4,973,508 | 11/1990 | Bretz . |
| 5,058,705 | 10/1991 | Rheinlander ............... 181/291 |
| 5,604,010 | 2/1997 | Hartz et al. ............... 428/116 |

FOREIGN PATENT DOCUMENTS

| | | |
|---|---|---|
| 2035807 | 1/1972 | Germany . |
| 3025617 | 2/1981 | Germany . |

*Primary Examiner*—Galen L. Barefoot
*Attorney, Agent, or Firm*—W. F. Fasse; W. G. Fasse

[57] ABSTRACT

A wall element has a noise attenuating characteristic and is suitable for use as an aircraft cabin interior panel element that is mounted directly on the aircraft fuselage structure. The wall element includes a rigid lightweight composite panel having a core arranged between two cover layers, and an outer layer arranged adjacent and spaced away from one of the cover layers. The core and the cover layers of the composite panel are air permeable in a direction through the thickness of the panel, while the outer layer is non-air-permeable and is relatively soft and flexible. The outer layer is connected to the composite panel preferably only along the perimeter edge thereof. The non-permeable outer layer faces the aircraft cabin space, while the permeable composite panel is mounted on the fuselage structure. With this structure, acoustic vibrations of the fuselage, to which the wall element is attached, are attenuated and do not result in substantial noise radiation from the outer layer into the cabin.

24 Claims, 1 Drawing Sheet

NOISE ATTENUATING WALL ELEMENT

FIELD OF THE INVENTION

The invention relates to a wall element or panel, which is especially applicable to the interior paneling of an aircraft cabin, and which has a noise attenuating characteristic particularly so as to reduce the radiation of structure-borne noise from this panel into the cabin.

BACKGROUND INFORMATION

It is generally known to use a lightweight composite panel, for example having a honeycomb core arranged between outer cover layers, as a wall element or interior panel element in aircraft cabins. The outer cover layers of the composite panel may comprise laminates of fiber-reinforced synthetic material. The visible outer surface of the wall element may be provided with an essentially acoustically neutral decorative layer, usually in the form of a colored structural film. Various attempts have been made to construct wall elements so as to have a noise attenuating characteristic, and particularly so as to absorb and attenuate noise or acoustic waves impinging upon the outer or visible surface of the wall element, for example from within the interior of the aircraft cabin. Such conventional attempts at noise-attenuating wall panel structures generally include an outer layer that is perforated or otherwise air permeable, so that sound waves can penetrate into the porous interior core of the panel, where the noise is attenuated.

However, it has now been recognized that a substantial portion of the cabin interior noise in an aircraft cabin outfitted with such wall elements is caused by the wall elements themselves vibrating along with the fuselage structure and thus radiating noise into the cabin (structure borne noise). In other words, the noise conducted through the solid fuselage structure as vibrations is also conducted into the wall elements, which thus accordingly vibrate and radiate noise into the cabin. More specifically, the fuselage structure borne noise or vibrations are conducted into the wall elements through the respective attachment or mounting components and are then radiated into the cabin from the outer surface of the respective wall element, which acts as a noise radiating membrane. Any attempts to reduce this noise radiating effect by providing isolation at the attachment or mounting points have very little success, because they are not effective at the proper or critical frequency ranges.

SUMMARY OF THE INVENTION

In view of the above it is an object of the invention to provide a wall element structure that is based on a light-weight composite panel, and that has a noise attenuating characteristic so as to achieve a significantly reduced noise radiation from the panel into an aircraft cabin. Further objects of the invention are to avoid or overcome the other disadvantages of the prior art, and to achieve additional advantages an set forth herein.

The above objects have been achieved in a wall element structure according to the invention, including a substantially rigid composite panel having a core arranged between two cover layers, wherein the core and the two cover layers are each air permeable in a direction substantially perpendicular to the surfacial extension direction of the panel, and further including an air impermeable, flexible outer layer arranged adjacent one of the cover layers. The outer layer is spaced away from the cover layer, so as to form and enclose an interspace therebetween. Preferably, the outer layer is connected to the cover layer, or the composite panel in general, only around the perimeter edges thereof, so as to minimize the extent of physical contact and connection between the outer layer and the composite panel. The connection between the outer layer and the composite panel may be provided by a spacing element in the form of a spacer strip or fillet, a double-sided adhesive tape or foam strip, or an adhesive by itself. The interspace between the outer layer and the cover layer of the composite panel may be a hollow air space or may have a soft, porous, open-celled synthetic foam arranged therein.

As a secondary feature of the invention, due to the provision of a solid, non-air-permeable outer layer, sound pressure waves are not transmitted directly through the present wall element from the fuselage side thereof to the cabin side thereof. More important, if the composite panel is set into vibration due to the acoustic vibrations of the fuselage structure (structure-borne noise), the air permeability of the composite panel avoids the generation of significant noise waves radiating away from the vibrating permeable composite panel. Any such noise waves are further damped as they must transition through the interspace between the composite panel and outer layer and then must be conducted through the solid, non-air-permeable outer layer itself. In this manner, the amount of structure-borne noise radiated from the complete wall element is significantly reduced in comparison to wall elements according to the prior art.

As a further advantage of the present wall element, it becomes unnecessary to provide specialized and complicated mounting elements, such as elastic rubber spring elements or the like, for mounting the wall elements on the fuselage structure. Instead, the present wall elements may simply be mounted by conventional screws, rivets, clips, or studs directly to the fuselage structure.

BRIEF DESCRIPTION OF THE DRAWINGS

In order that the invention may be clearly understood, it will now be described, in connection with example embodiments thereof with reference to the drawings, wherein.

DETAILED DESCRIPTION OF PREFERRED EXAMPLE EMBODIMENTS AND OF THE BEST MODE OF THE INVENTION

Figure 1A:
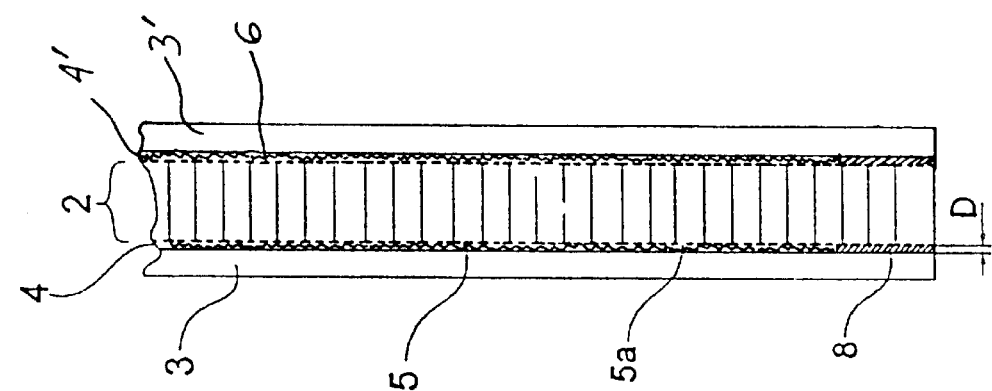
FIG. 1A shows a variant of a wall element according to the invention, having two cover layers.
Figure 1:
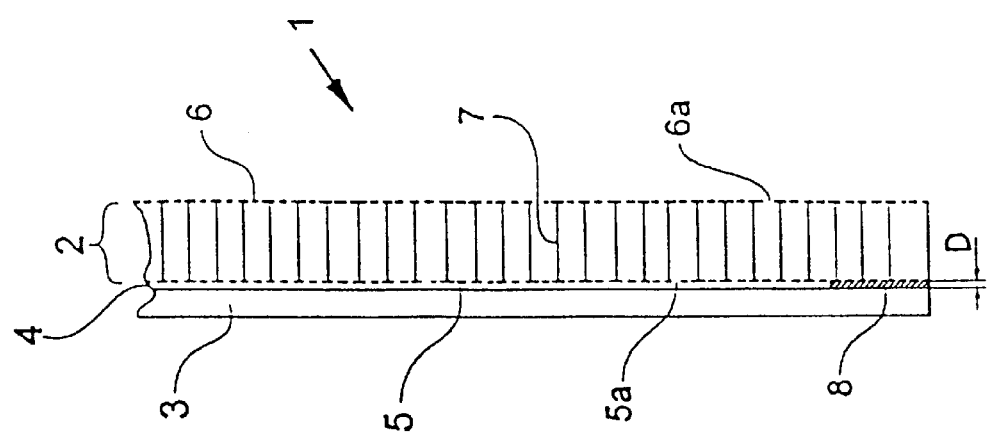
FIG. 1 shows a schematic cross-section through a wall element according to the invention.

FIG. 1 schematically shows a wall element 1 according to the invention comprising a flexurally stiff or rigid lightweight composite panel 2, including a core 7 arranged between two cover layers 5 and 6, and comprising an outer layer 3 arranged on the side of the composite panel 2 adjacent the cover layer 5. The outer layer 3 is intended to face toward the interior of an aircraft cabin or the like, while the opposite cover layer 6 is intended to face toward and be connected to a fuselage structure or the like.

The cover layers 5 and 6 respectively comprise openings 5A and 6A, such as uniformly distributed perforations, such that the cover layers 5 and 6 are air permeable in a direction through their thickness or substantially perpendicular to their surfacial extension direction. In the present embodiment, in order to provide the required air permeability, the cover layers 5 and 6 respectively comprise so-called perforated prepregs. The core 7 is also air permeable in a direction through its thickness or substantially perpendicular to the surfacial extension direction of the composite panel 2. In the present embodiment, the core 7 comprises a honeycomb core which provides the required air permeability through its open honeycomb cells. The cover layers 5 and 6 are arranged and supported on the honeycomb core 7.

The outer layer 3 comprises a relatively soft and flexible layer of solid, air-impermeable material, without holes or perforations, and may have a decorative or attractive finish applied on the outer visible surface thereof. The outer layer 3 may be a solid plastic or other synthetic panel, or a solid or substantially solid composite panel such as a fiber-reinforced panel, or even a thin metal panel or the like. The outer layer 3 is connected to the cover layer 5 or to the composite panel 2 in general, preferably only around the perimeter edges of the outer layer 3, whereby the outer layer 3 is spaced away from the cover layer 5 so as to form an interspace 4 therebetween. The lower portion of FIG. 1 shows a cross-section through a perimeter edge of the wall element 1, wherein the outer layer 3 is connected to the cover layer 5 by means of a spacer element 8 having a thickness D. The thickness of the interspace 4 is thus determined by the thickness D of the spacer element 8, whereby the outer layer 3 is spaced away from and not in contact with the cover layer 5 except through the spacer element 8 which may be continuous entirely around the perimeter edges of the outer layer 3.

In its installed condition, the wall element 1 is secured to the structure of the aircraft by any conventional means at attachment or mounting locations which are not shown or indicated in the present drawings. For example, the wall element 1 may be connected to the fuselage structure by conventional screws, rivets, clips, or studs. In the event that the fuselage structure is subjected to an acoustic vibration, such vibration would at least partially be conducted into the wall element 1 through the attachment or mounting elements. In this case, the composite panel 2 would correspondingly undergo the rapid bending oscillations or vibrations. Nonetheless, due to the air permeability of the composite panel 2, the vibrating panel 2 hardly causes any sound waves radiating therefrom. Due to the air permeability thereof, the composite panel 2 forms a fluid dynamic, acoustic short-circuit, whereby the vibrations of the panel 2 are not substantially converted into sound waves. Namely, the air surrounding the composite panel 2 does not undergo substantial compression and decompression due to the because the air may readily escape into and through the holes or air passages permeating through the panel, whereby only a small amount of noise waves are radiated perpendicularly away from the panel through the surrounding air. Moreover, any such noise waves must then cross through the interspace 4 and be transferred through the outer layer 3 before resulting in noise in the cabin. This would require that the noise waves travelling across the interspace 4 impinge upon and vibrate the outer layer 3, which in turn would have to re-radiate noise waves. However, the outer layer 3 is specifically embodied with characteristics so that it operates as a further noise damping member, for example due to its relatively soft and flexible property, so that the amount or sound level of noise ultimately radiated from the outer exposed surface of the outer layer 3 is significantly reduced.

The spacer element 8 may, for example comprise a plastic, metal or composite batten or fillet strip running along the perimeter edge of the composite panel 2, whereby the batten or fillet strip is connected to the composite panel 2 and the outer layer 3 by means of gluing or other adhesive bonding. In this embodiment, a noise vibration conducting contact between the composite panel 2 and the outer layer 3 only exists around the perimeter edge of the panel 2, so that the outer layer 3 is substantially isolated and can vibrate or oscillate in a practically free manner. Due to the softness and flexibility of the outer layer 3, it will undergo bending vibrations or oscillations only extremely slowly in the event that it is subjected to a vibrational excitation, whereby no consequential noise radiation is generated by the outer layer 3.

In a particularly simple alternative embodiment, the spacer element 8 may comprise a double-sided adhesive tape or foam strip having a corresponding appropriate thickness D, instead of a solid batten or fillet strip. In a further variation of the invention, the spacer element 8 may simply be a strip of adhesive. However, such an adhesive would typically have a relatively minimal thickness, so that the outer layer 3 would practically be in direct contact with the cover layer 5 of the composite panel 2. Since the interspace 4 would thus have a rather small thickness D, and because some vibrational conduction directly to the outer layer 3 might occur in such a case, it might be expected that the overall or total noise damping would be reduced, but it has been found that such a reduction in damping is minimal.

A further embodiment of the invention is represented in FIG. 1A, wherein a soft, porous, open-celled synthetic foam 4' is arranged in and filling the interspace 4 between the outer layer 3 and the cover sheet 5 of the composite panel 2. This synthetic foam may conveniently be installed in the form of a thin foam mat or sheet between the composite panel 2 and the outer layer 3, and the synthetic foam mat or sheet is glued or otherwise adhesively bonded to both the panel 2 and the outer layer 3. This embodiment might also be expected to provide a somewhat reduced total or overall noise damping characteristic as compared to the above embodiment in which the interspace 4 is a hollow open space and the outer layer 3 is a substantially freely vibrating or oscillating layer. However, it has been found that the reduction in noise damping is minimal, and the use of proper foams having a selected porosity, softness, material density, and the like can achieve particular noise damping in critical frequency ranges.

As further shown in FIG. 1A, it is also possible to arrange a second air-impermeable outer layer 3', corresponding to the outer layer 3, on the opposite side of the composite panel 2, namely adjacent the cover layer 6. This embodiment is especially suitable for manufacturing cabin partition walls and the like, while the above embodiment having only one outer layer 3 on one side of the composite panel 2 is suitable for use as wall and ceiling paneling in the aircraft cabin.

The materials to be used for the composite panel 2, the outer layer 3, and the other components of the present wall element may be any typical or conventionally known materials, or semi-finished products, with the only requirement being that the respective materials have the required characteristics or properties in each case. Thus, for example, the cover layers 5 and 6 may comprise so-called grid or mesh pre-pregs based on carbon and/or glass fibers in combination with a suitable resin. The core 7 of the composite panel 2 may be a honeycomb core of any known construction as described above, or may be a permeable core formed by a tubule structure or by a porous hard foam. The hollow passages through the tubules of a tubular core structure readily provide the required air permeability in the direction perpendicular to the plane of the composite panel, analogously to the above described honeycomb core, while the hard foam core must be embodied with a sufficient porosity of the open-celled structure to achieve the required air permeability.

Figure 2:
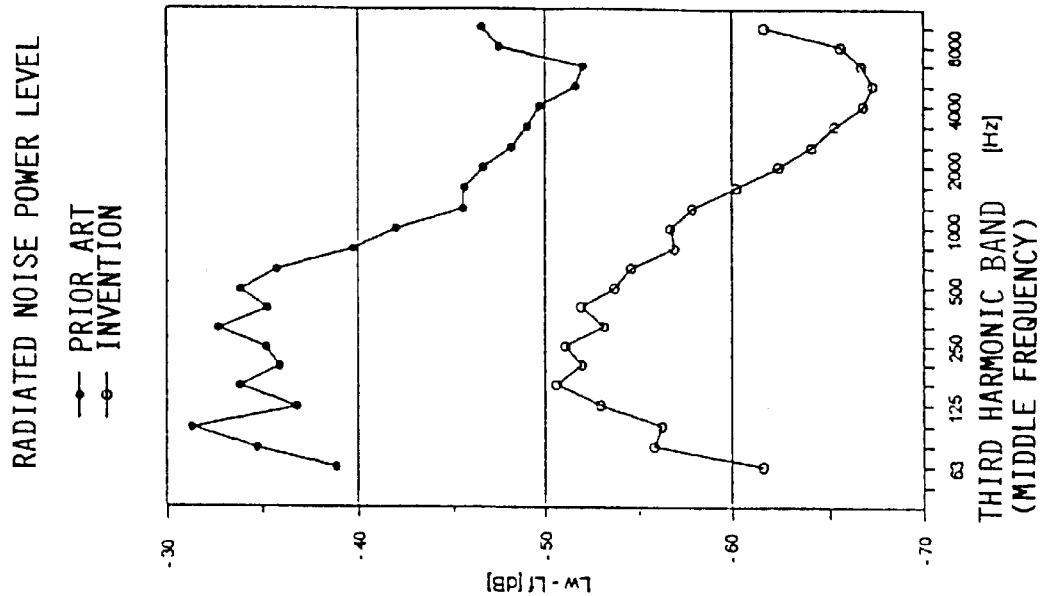
FIG. 2 shows a diagram of sound levels radiated from a wall element according to the invention in comparison to sound levels radiated from a conventional wall element, over a range of frequencies, when excited by a shaker.

FIG. 2 is a diagram showing measured test results of noise sound levels radiated at different frequencies from a conventional wall element based on a composite panel, and from a wall element according to the invention having a non-air-permeable outer layer applied over and spaced away from an air permeable composite panel. Both of these wall elements were mounted on a shaker by conventional non-isolating mounting elements, and were then vibrated or excited with the same force applied over the same frequency spectrum. As can be seen in FIG. 2, the wall element according to the invention achieved a reduction of noise radiation of at least 10 to 20 dB over the entire tested frequency range from 63 Hz to over 10,000 Hz. The noise levels were tested at respective third harmonic frequency groups or bands, reported for the middle or center frequency. The noise levels are indicated by the difference Lw–Lf.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A wall element comprising:
   a rigid lightweight composite panel including a core having first and second opposite major surfaces, and first and second cover layers respectively arranged on said first and second opposite major surfaces of said core, and
   a first outer layer that is arranged spaced away from said first cover layer with a first interspace therebetween, and that is connected to said first cover layer continuously along a perimeter edge of said first outer layer,
   wherein said first and second cover layers and said core are all air permeable in a direction through a thickness of said composite panel, and
   wherein said first outer layer comprises a flexible and non-air-permeable layer.

2. The wall element according to claim 1, further comprising a spacer element arranged between and interconnecting said first outer layer and said first cover layer at said perimeter edge of said first outer layer.

3. The wall element according to claim 2, wherein said spacer element comprises a fillet strip.

4. The wall element according to claim 3, further comprising an adhesive bonding said fillet strip respectively to said first outer layer and to said first cover layer.

5. The wall element according to claim 2, wherein said spacer element comprises a double-sided adhesive tape.

6. The wall element according to claim 5, wherein said double-sided adhesive tape comprises a foam strip and an adhesive on two opposite sides of said foam strip.

7. The wall element according to claim 2, wherein said spacer element consists of an adhesive.

8. The wall element according to claim 2, wherein said spacer element is continuous around an entirety of said perimeter edge of said first outer layer.

9. The wall element according to claim 1, further comprising a soft, open-celled, synthetic foam arranged in said interspace and connected to said first outer layer and said first cover layer.

10. The wall element according to claim 1, further comprising a visually decorative surface finish on an exposed surface of said first outer layer.

11. The wall element according to claim 1, wherein said first outer layer is connected to said first cover layer only at said perimeter edge, and is not connected to and not in contact with said first cover layer other than at said perimeter edge.

12. The wall element according to claim 11, wherein said interspace is an empty hollow air space extending across an entire surface area of said first outer layer.

13. The wall element according to claim 1, wherein said core comprises a honeycomb core with honeycomb cells extending axially between said first and second opposite major surfaces.

14. The wall element according to claim 1, wherein said core comprises a tubular core structure with tubular cells extending axially between said first and second opposite major surfaces.

15. The wall element according to claim 1, wherein said core comprises a rigid, open-celled, synthetic foam.

16. The wall element according to claim 1, wherein said cover layers respectively comprise perforated prepreg layers comprising at least one of carbon and glass fibers.

17. The wall element according to claim 1, wherein said first outer layer consists of a material that is softer and more flexible than said composite panel.

18. The wall element according to claim 1, wherein said wall element is an aircraft cabin interior wall or ceiling panel with said outer layer facing and exposed to a cabin interior space.

19. The wall element according to claim 1, further comprising a second flexible and non-air-permeable outer layer that is arranged spaced away from said second cover layer with a second interspace therebetween and that is connected to said second cover layer at a perimeter edge of said second outer layer.

20. The wall element according to claim 19, wherein said wall element is an aircraft cabin divider partition wall with said first and second outer layers both respectively facing and exposed to a cabin interior space.

21. In an aircraft including a fuselage, a cabin interior space within said fuselage, and a cabin wall panel connected to said fuselage and bounding said cabin interior space, the improvement wherein said cabin wall panel comprises:
   a rigid lightweight composite panel including a core having first and second opposite major surfaces, and first and second cover layers respectively arranged on said first and second opposite major surfaces of said core, and
   a first outer layer that is arranged spaced away from said first cover layer with a first interspace therebetween, and that is connected to said first cover layer at a perimeter edge of said first outer layer,
   wherein said first and second cover layers and said core are all air permeable in a direction through a thickness of said composite panel,
   wherein said first outer layer comprises a flexible and non-air-permeable layer, and
   wherein said first outer layer faces and is exposed to said cabin interior space, and said composite panel is directly rigidly connected to said fuselage.

22. The wall element according to claim 1, wherein said first outer layer is connected to said first cover layer only along said perimeter edge and is not connected rigidly to said first cover layer through said first interspace.

23. The improvement in the aircraft according to claim 21, wherein said first outer layer is connected to said first cover layer only along said perimeter edge and is not connected rigidly to said first cover layer through said first interspace.

24. A wall element comprising:
- a rigid lightweight composite panel including a core having first and second opposite major surfaces, and first and second cover layers respectively arranged on said first and second opposite major surfaces of said core,
- a first outer layer that is arranged spaced away from said first cover layer with a first interspace therebetween, and
- a spacer element comprising a fillet strip arranged between and interconnecting said first outer layer and said first cover layer at a perimeter edge of said first outer layer,
- wherein said first and second cover layers and said core are all air permeable in a direction through a thickness of said composite panel, and
- wherein said first outer layer comprises a flexible and non-air-permeable layer.

* * * * *

UNITED STATES PATENT AND TRADEMARK OFFICE
CERTIFICATE OF CORRECTION

PATENT NO. : 6,065,717

DATED : May 23, 2000

INVENTOR(S) : Boock

It is certified that error appears in the above-identified patent and that said Letters Patent is hereby corrected as shown below:

Col. 2, line 16, after "More", replace "important" by --importantly--.

Col. 3, line 52, after "the", insert --vibrations,--.

Signed and Sealed this

Twenty-seventh Day of March, 2001

Attest:

NICHOLAS P. GODICI

Attesting Officer

Acting Director of the United States Patent and Trademark Office